Oct. 26, 1954    W. H. GILLE    2,692,510
CONTROL APPARATUS
Filed Aug. 15, 1951    2 Sheets-Sheet 1
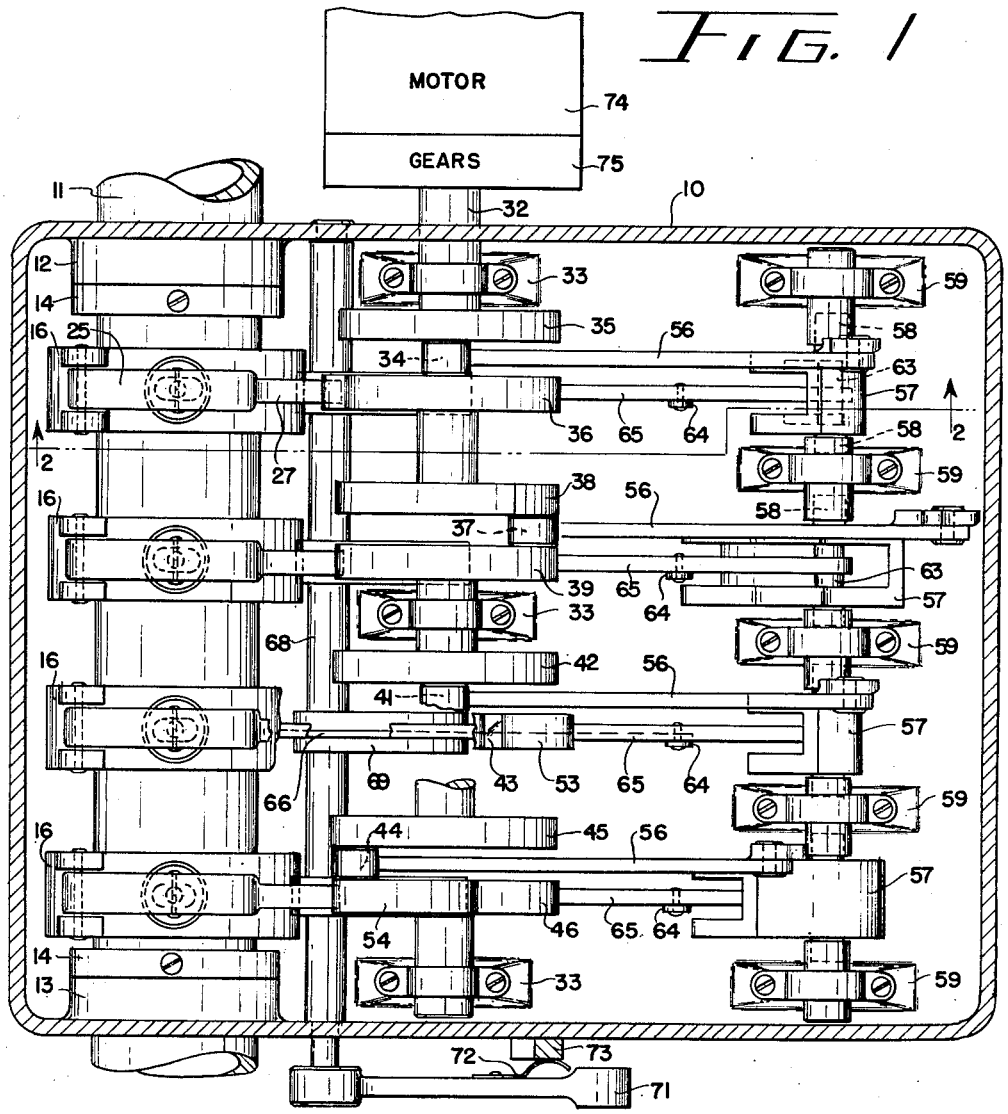
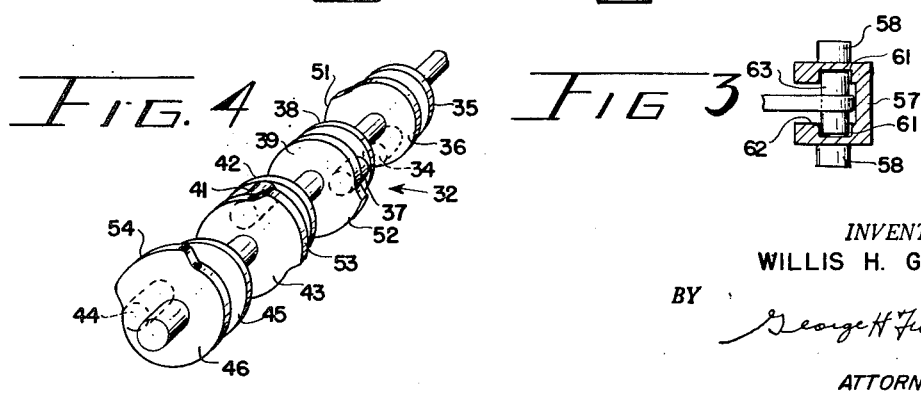
INVENTOR.
WILLIS H. GILLE
BY
George H. Fisher
ATTORNEY Oct. 26, 1954   W. H. GILLE   2,692,510
CONTROL APPARATUS
Filed Aug. 15, 1951
2 Sheets-Sheet 2
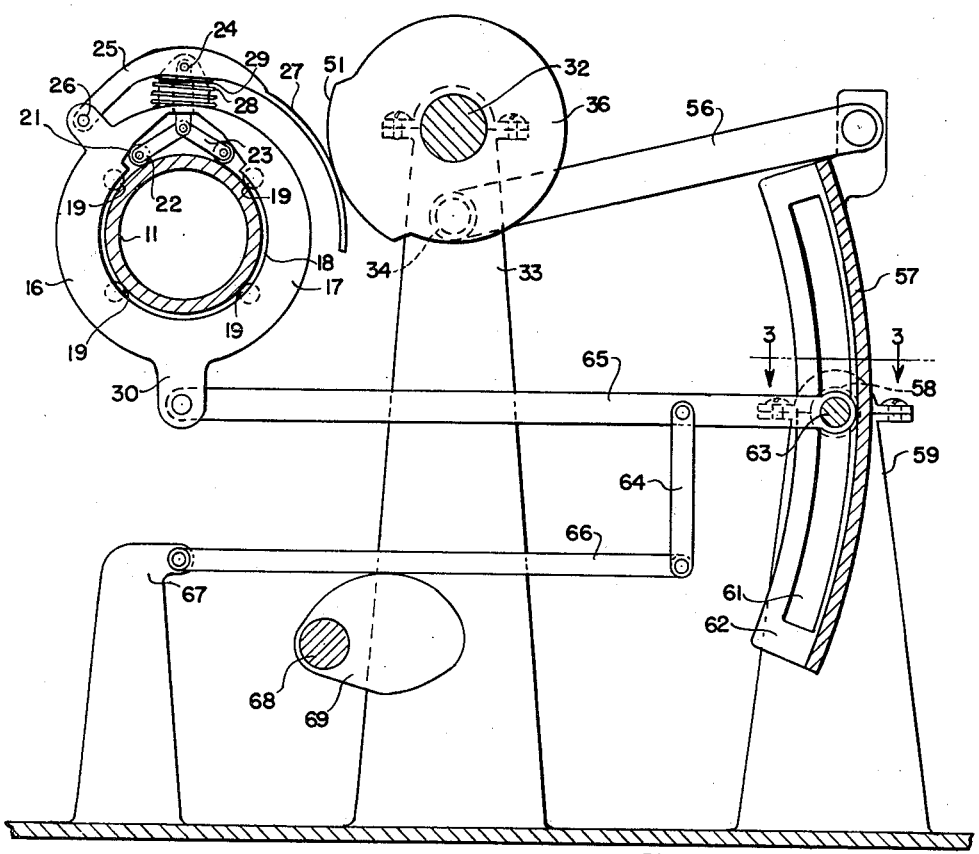
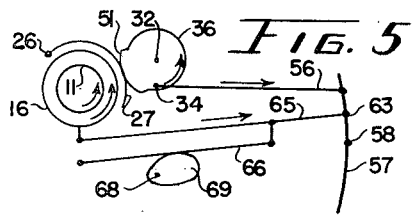
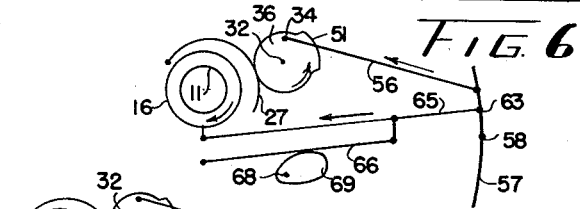
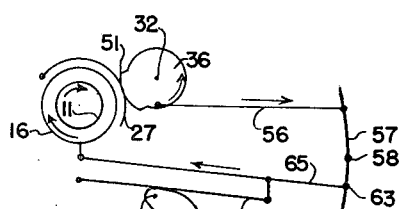
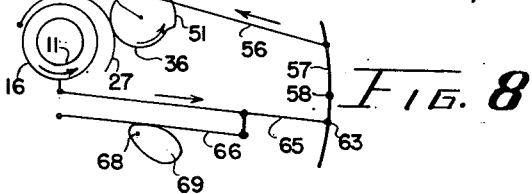
INVENTOR.
WILLIS H. GILLE
BY George H Fisher
ATTORNEY Patented Oct. 26, 1954

2,692,510

UNITED STATES PATENT OFFICE 2,692,510

CONTROL APPARATUS

Willis H. Gille, St. Paul, Minn., assignor to Minneapolis-Honeywell Regulator Company, Minneapolis, Minn., a corporation of Delaware Application August 15, 1951, Serial No. 241,998

3 Claims. (Cl. 74—119)

This invention relates to a mechanical transmission continuously and smoothly adjustable in speed from full speed in one direction to full speed in an opposite direction.

Mechanical transmissions of this general type are broadly old but the known existing devices require separate mechanisms for varying speed and reversing and, because these mechanisms are separate, it is possible to instantly reverse from full speed in one direction to full speed in the reverse direction with a consequent abuse of the transmission and other apparatus. Such abuse is not possible with the present transmission and, further, this transmission also provides a positive driving connection between the driving and the driven shafts at all times.

The present transmission uses a plurality of driving members controlled by cams in such a manner that one member is positively connected to the driven shaft at all times. Speed control is obtained by varying the throw of the driving links of the apparatus and reversal is obtained by varying the phase relation between the controlling cams and the driving linkage.

It is thus an object of this invention to provide an improved infinitely variable positive drive mechanical transmission, and it is an additional object to provide such a transmission in which reversal is obtained by varying the phase relation between the driving and driven members.

These and other objects will become apparent upon a study of the following specification and drawings wherein:

Figure 1 is a plan view of the present transmission, with parts broken away to better show the construction.

Figure 2 is an end elevation view of one of the sets of mechanism.

Figure 3 is a section view taken on the line 3—3 of Figure 2.

Figure 4 is a perspective view of the driving shaft and cams.

Figure 5 is a schematic view similar to Figure 2 and showing the relation of parts as the output shaft is driven in one direction.

Figure 6 is similar to Figure 5 but with the output shaft not being driven.

Figure 7 is similar to Figure 5 but shows a different phase relation between driving and driven parts.

Figure 8 is similar to Figure 6 but with the changed phase of the parts.

In Figure 1, casing 10 forms a base in which is mounted the various mechanisms constituting the present transmission, this casing also serving as an enclosure and an oil reservoir for the lubricating means, not shown. A driven or output shaft 11 is journalled in bearings 12 and 13 formed in the walls of casing 10, shaft 11 being held in place by collars 14. While the output shaft 11 is shown as a hollow member, it is, so far as this invention is concerned, immaterial whether this shaft be hollow or solid.

As shown in Figures 1 and 2, a plurality of collar-like members 16 are rotatably mounted on shaft 11, these members 16 all being alike, and the description of the member in Figure 2 applies to all of the members. Each of members 16 comprises a body portion 17 having a circular opening 18 therethrough slightly larger than shaft 11, with guide rolls 19 being disposed about the bore 18 to maintain body member 17 concentric with shaft 11. In addition to bore 18, a pair of opposed wedge-like surfaces 21 are formed at one side of the bore and coact with a pair of friction rolls 22 guided by a toggle linkage 23 connected to an operating pin 24, these wedge surfaces 21 coacting with rolls 22 in such a manner that when pin 24 is pushed into the position shown, the rolls 22 are wedged between surfaces 21 and tube 11 firmly enough to prevent rotative movement between body 17 and shaft 11. Upon pin 24 being raised, thereby folding linkage 23 to some extent, the rolls are sufficiently loosened so that they will have no retarding effect on the rotation of member 16 relative to shaft 11. This wedge surface-roll arrangement is only illustrative of one sort of a practical clutch arrangement that may be used in this device. Operating pin 24 is controlled by a lever 25 pivoted to 17 at 26 and having a resilient cam follower portion 27, the resilience of portion 27 being sufficient to prevent harmful stresses being imposed on pin 24 and linkage 23. Cam follower portion 27 is, in the locking position shown, concentric with bore 18 and shaft 11 but, when lever 25 is forced upwardly by spring 28 to a roll released position, obviously portion 27 is no longer concentric with the bore and the shaft. Spring 28 is arranged around an upstanding boss 29 which not only serves to locate the spring but provides additional bearing surface for pin 24. Diametrically opposite boss 29 is a projecting lug 30 which is provided for connection to the driving means of the mechanism. While the lug 30 is diametrically opposed to boss 29, this location is merely one of convenience for the present illustration and may be differently located if the driving means be differently arranged.

The driving shaft 32 is journalled in pedestal bearings 33 and is arranged parallel to shaft 11. Drive shaft 32 is, in this example, built up of a plurality of straight shaft portions, and parallel discs connected by crank pins. Thus, crank pin 34 connects discs 35 and 36; crank pin 37 connects discs 38 and 39; crank pin 41 connects discs 42 and 43 and crank pin 44 connects discs 45 and 46. In addition to the various discs forming part of drive shaft 32, discs 36, 39, 43 and 46 include cam portions 51, 52, 53 and 54, respectively. These cam portions each extend for 90° of angular travel of the shaft, with each of the cam surfaces being arranged 90° offset with respect to the adjacent cam so that the four cam portions in the aggregate total a full revolution. Drive shaft 32 is not only arranged parallel to shaft 11 but also disc 36, with its cam portion 51, is arranged to coact with cam follower 27 of the collar-like member 16, and discs 39, 43, and 46 are likewise arranged so that they and their cam portions will coact in a like manner with the cam follower portions of the other members 16 disposed along shaft 11. The cam portions of these discs are high enough so that when the cam portion engages its respective follower portion 27, the rolls 22 are held in locking engagement with shaft 11 and the remaining portion of the discs are small enough in diameter so that when the cam portion leaves the follower portion, the lever 25 is forced upwardly sufficiently by spring 28 to release the rolls from their driving relation. By having four sets of driving mechanisms, as above described, and by having the cams each effective over 90 angular degrees of travel, it is obvious that one collar-like member is fixed to the shaft at any particular time, with the other three members being free to rotate relative to the shaft. Obviously, if only two sets of driving mechanisms are used, then each cam surface should be 180 angular degrees in extent; if three sets of mechanisms are used, each cam should extend for 120 degrees of travel, and if eight sets of mechanisms should be used, for instance, then each cam should be of 45 angular degrees extent.

Each of the aforementioned crank pins, such as 34, is connected by a connecting rod such as 56, in Figure 2, to the upper end of an intermediate member 57. The intermediate or oscillating members 57 are each formed with a pair of oppositely disposed stub shafts or pivots 58, these pivots being arranged near the center of the member, as shown in Figures 2 and 3. Pivots 58 are journalled in pedestal bearings 59, with each of the intermediate pedestal bearings 59 of Figure 1 receiving the pivots 58 of two adjacent intermediate members 57, the bearings 59 being so arranged that the pivot members 58 are all in general alignment. Members 57 are formed in the shape of an arc and are provided with guide grooves of arcuate shape 61 having a radius equal to the length of link 65 formed in the walls of the channel-like section 62 of member 57, the grooves 61 extending in substantially opposite directions from the intermediate pivot so that pins 63 may be moved from one end of the grooves 61 to the other end to serve as attachment points and pivots. Pins 63, when at an intermediate adjustment such as shown in Figure 2 and in Figure 1, although not so apparent in Figure 1, have their axes in alignment with pivots 58 so that rocking movement of member 57 will cause no more than rocking movement of members 63.

As shown in Figure 1 and suggested by Figure 4, the positions of each of the various members 57 depend on the position of its corresponding crank pin, each of the connecting rods 56 being of the same length. With the arrangement described, rotation of drive shaft 32 causes reciprocating movements of connecting rods 56 and an oscillating movement of members 57. Each slidable pin 63 is connected by a link 65 to lug 30 of a member 16 so that reciprocating movements of each pin 63 will be transmitted to its lug 30. As before mentioned, in the position shown in Figure 2, oscillation of 57 causes no reciprocating movement of pins 63, hence no movement of members 16.

To adjust the position of pins 63 in members 57, a set of links 66 arranged parallel to 65 are pivoted at one end to pedestal bearings 67 and are connected at their other ends through links 64 to links 65, and a shaft 68 is provided below links 66 and carries cams 69 for engaging each link 66, each of cams 69 being similar in shape and in the same angular position on shaft 68 so that all links 66 are similarly adjusted at the same time. Shaft 68 is journalled in casing 10 and is adjusted by any suitable means, such as a manually operated lever 71 having a friction member 72 bearing against a friction surface 73 to hold member 71 in any adjusted position. Obviously, shaft 68 may be adjusted in any desired manner such as by a control motor or the like. While the above description has been recited on the basis of the apparatus shown in Figure 2 and more generally shown in Figure 1, it is obvious that each of the sets of driving equipment in Figure 1 is the same in each of its parts with the exception of the disposal of the crank pin and the cam surface of each of the sets of equipment, thus resulting in the members 57 being held in different adjusted attitudes or positions but with the apparatus, in the adjustment shown in Figure 2, being incapable of causing any motion of members 16. Thus, in the position of the apparatus shown in Figure 2, the apparatus is in neutral so that the shaft 32, when driven by motor 74 through gear train 75, merely oscillates the members 57 by connecting rods 56, with the cams 51, 52, 53 and 54 sequentially operating their cam follower portions 27 and thereby sequentially locking the members 16 to shaft 11, but, beyond this activity, no operation takes place.

*Operation*

However, to operate the present mechanism, all that is required is to rotate cam shaft 68 sufficiently to raise or lower pins 63 so that the oscillating motions of members 57 can be transferred to reciprocating motions of links 65. Assuming that cam 69 forces levers 66 and 65 upwardly, as shown in Figure 5 for a single set of mechanisms, and thereby arranges pin 63 above pivots 58, it is obvious that the counterclockwise movement of crank pin 34 is transmitted into motion to the right of connecting rod 56 and clockwise movement of member 57, with this direction of movement of member 57 also causing a movement to the right of link 65. This movement of link 65 causes a counterclockwise movement of member 16 and, since cam follower 27 is compressed by cam 51, member 16 is locked to the shaft 11 and the shaft rotates counterclockwise. As soon as the drive shaft 32 rotates far enough for cam 51 to rotate out of engagement with follower 27, follower 27 and its lever 25 are forced upwardly into a release position for rolls 22. Then, member 16 is no longer locked to shaft 11 so that when, as shown in Figure 6, continued counterclockwise movement of drive shaft 32 causes a movement to the left of connecting rod 56 and a movement to the left of link 65, member 16 is no longer connected to shaft 11, so this set of mechanisms cannot cause any movement of shaft 11. As previously described, there are four sets of apparatus such as shown in Figures 5 and 6 and the cams are arranged so that one at a time is in control of a collar-like mechanism so that, with the apparatus adjusted as shown in Figures 5 and 6, one set of mechanism is always controlling the shaft in the manner shown in Figure 5 while the other three sets of mechanisms are disengaged from the shaft, as in Figure 6.

With the mechanism in the position shown in Figures 5 and 6, shaft 11 will rotate at a speed definitely related to drive shaft 32 and this speed may be varied by moving pin 63 closer to 58 to reduce the speed and by moving pin 63 further away from pivots 58 to increase the speed, the speed of the output shaft being a function of the amount of travel of link 65 during the time its collar-like member is locked to the shaft. Obviously, the movement of link 65 will vary from zero when pin 63 aligns with pivots 58 to a maximum when pin 63 is at a maximum distance away from the pivots 58.

If now, instead of moving pin 63 above pivots 58, as in Figures 5 and 6, the pin 63 be adjusted below pivots 58, as in Figures 7 and 8, it will be obvious that a rotative movement of member 57 formerly tending to cause movement to the right of links 65 will now cause movement to the left of the link, as seen by comparing Figures 5 and 7. Thus, relative to the driving means, the movement of pin 63, link 65 and mechanism attached thereto is reversed in phase from that of the like mechanism when the pin 63 was on the opposite side of pivots 58. As shown in Figure 7, with the apparatus adjusted to now position 63 relatively low on member 57, the counterclockwise movement of shaft 32 causes a movement to the right of connecting rod 56, a clockwise movement of member 57, a movement to the left of member 65 and a clockwise movement of member 16 which, because cam 51 is pressing in on cam follower 27, locks member 16 to shaft 11 and causes rotation of shaft 11 in a clockwise direction. Later in the cycle of the same apparatus, as in Figure 8, when connecting rod 56 is now moving to the left and link 65 is moving to the right, no reversal takes place of shaft 11 because member 16 is not connected to the shaft because cam 51 has passed beyond cam follower 27 and permitted lever 25 to be pushed to a nonlocking position.

While it has been stated that from two to eight or more sets of equipment may be used for connecting the drive shaft to the driven shaft, varying speeds and reversibility may be obtained by a single set of apparatus but, in such a case, it is obvious that the driven shaft cannot be locked to the driving means for more than half of each cycle if the driven shaft is to rotate in a single direction. Further, because the rotary motion is transferred to reciprocating motion and back to rotary motion, the angular movements of the driven shaft tend to be nonuniform, with the nonuniformity being most pronounced when one or two sets of apparatus are used and being progressively lessened as more sets of apparatus are used. For this reason, four or more sets of apparatus are preferred.

Because the present invention is susceptible of many substitutions and equivalents, its scope should be determined only by the appended claims.

I claim as my invention:

1. In a transmission and reversing mechanism, a driven shaft, a driving shaft, an oscillatable driving means having an intermediate pivot fixedly attached thereto and having an elongated guide means extending in opposite directions from said pivot, driving means between said driving shaft and said oscillatable driving means for oscillating said oscillatable driving means, additional oscillatable means rotatably mounted on said driven shaft, clutch means carried by said additional oscillatable means for locking the same to said shaft, said additional oscillatable means including a motion transmitting connection means, lever means pivoted to said additional oscillatable means and having a curved surface substantially concentric with said driven shaft for operating said clutch means, eccentric means connected to said driving shaft and arranged to engage said curved surface and thereby operate said lever means directly, link means having one end connected to said connection means and having its other end pivotally and slidably connected to said guide means, and means for adjusting said slidable connection along said guide means from one side of said pivot to the other.

2. In a transmission mechanism, a driven shaft, a collar member rotatably mounted on said shaft and having a projection, friction means for preventing rotation of said member relative to said shaft, said friction means being adjustable from an operative to an inoperative position, lever means mounted on said collar means and having an outer curved surface substantially concentric with said driven shaft for adjusting said friction means, eccentric means directly arranged to engage said outer curved surface and operate said lever means and thereby control said friction means, an elongated oscillatable member having a fixed intermediate pivot, driving means for oscillating said oscillatable member, means for operating said eccentric means in synchronism with said oscillatable member, guide means extending along said oscillatable member on opposite sides of said pivot, a link having one end pivoted to the projection on said collar member and having its other end slidable along and pivotally attached to said guide means, and means for adjusting said other end of said link along said guide means and from one side to the other of said pivot means.

3. An infinitely variable and reversible transmission comprising a driven shaft, a driving shaft, collar-like means rotatably mounted on said driven shaft, clutch means carried by said collar-like means and operable to prevent rotation of said collar-like means relative to said driven shaft, rotatable eccentric means, curved lever means pivoted to said collar-like means and connecting said eccentric means and said clutch means in operative relation, said curved lever means having an outer eccentric engaging surface substantially concentric with said driven shaft, means for rotating said eccentric means in synchronism with said driving shaft, an oscillatable member having an intermediate pivot fixedly attached thereto, said oscillatable member being elongated in the shape of an arc and having guide means extending along said arc shaped member and in opposite directions from said intermediate pivot, means driven by said driving means for oscillating said oscillatable member, link means having one end pivotally connected to said guide means and shiftable therealong, means connecting the other end of said link means in motion transmitting relation to said collar-like means, and means for shifting the one end of said link means along said guide means.

References Cited in the file of this patent

UNITED STATES PATENTS

| Number | Name | Date |
|---|---|---|
| 1,015,618 | Fellows | Jan. 23, 1912 |
| 2,654,259 | Tisdale | Oct. 6, 1953 |

FOREIGN PATENTS

| Number | Country | Date |
|---|---|---|
| 315,641 | Great Britain | July 18, 1929 |
| 385,376 | France | May 9, 1908 |